(12) United States Patent
Tosh, IV

(10) Patent No.: US 11,400,776 B2
(45) Date of Patent: Aug. 2, 2022

(54) HYDRAULIC LIFT MECHANISM AND METHOD OF USE

(71) Applicant: J-Pyott and Associates, Inc., Cedar Bluff, VA (US)

(72) Inventor: Charlie L. Tosh, IV, Bluefield, VA (US)

(73) Assignee: J-PYOTT AND ASSOCIATES, INC., Cedar Bluff, VA (US)

( * ) Notice: Subject to any disclaimer, the term of this patent is extended or adjusted under 35 U.S.C. 154(b) by 114 days.

(21) Appl. No.: 16/862,728

(22) Filed: Apr. 30, 2020

(65) Prior Publication Data

US 2020/0361256 A1 Nov. 19, 2020

Related U.S. Application Data

(60) Provisional application No. 62/847,370, filed on May 14, 2019.

(51) Int. Cl.
*B60D 1/07* (2006.01)
*B60D 1/46* (2006.01)
*B60D 1/44* (2006.01)
*B60D 1/06* (2006.01)
*E01C 19/15* (2006.01)

(52) U.S. Cl.
CPC .............. *B60D 1/07* (2013.01); *B60D 1/065* (2013.01); *B60D 1/44* (2013.01); *B60D 1/46* (2013.01); *E01C 19/15* (2013.01)

(58) Field of Classification Search
CPC . B60D 1/07; B60D 1/065; B60D 1/44; B60D 1/46; E01C 19/15
See application file for complete search history.

(56) References Cited

U.S. PATENT DOCUMENTS

| 9,873,300 | B1* | 1/2018 | Gramlow | B60D 1/44 |
| 2004/0021292 | A1* | 2/2004 | Abair | B60D 1/40 280/456.1 |
| 2011/0101644 | A1* | 5/2011 | Schneider | B62D 63/061 280/417.1 |
| 2013/0284466 | A1* | 10/2013 | Layton | E02F 3/7604 172/1 |
| 2016/0096405 | A1* | 4/2016 | Dueck | B60D 1/46 280/444 |
| 2018/0092285 | A1* | 4/2018 | Centerbar | B60D 1/07 |
| 2018/0242509 | A1* | 8/2018 | Pennybacker | A01B 59/042 |

* cited by examiner

*Primary Examiner* — Jacob D Knutson
*Assistant Examiner* — Abigail R Hymel
(74) *Attorney, Agent, or Firm* — Clark & Brody LP

(57) ABSTRACT

A hitch mechanism adapted to be attached to a vehicle and support a device includes a hitch receiver adapted to attach to the vehicle and a pair of pull arms. A first end of each pull arm is attached to the hitch receiver and a second end of each pull arm is configured to attach to the device. Each pull arm has an adjustable length and being pivotal horizontally and vertically. The hitch assembly allows a device such as a material spreader to be attached to a vehicle so that the device can be operated in its intended way.

10 Claims, 18 Drawing Sheets

US 11,400,776 B2

HYDRAULIC LIFT MECHANISM AND METHOD OF USE

This application claims priority from application No. 62/847,370, filed on May 14, 2019, which is incorporated in its entirety herein.

FIELD OF THE INVENTION

A hydraulically operated lift mechanism is adapted to link a vehicle like a truck and a device for use with the truck.

BACKGROUND ART

Material spreaders are commonly used on the back of trucks. The material spreaders are designed to receive a load from the truck and then spread the load by moving the truck and spreader attached to the truck forward for material spreading. It is common for heavy trucks to be used for the manipulation and operation of construction and road maintenance products. These products require a more complex mounting system than a typical single point trailer hitch. This invention covers a design primarily for use as a mounting system for a material spreader product, but this design is adaptable for use as an attachment method for many construction and road maintenance products that could benefit from the added features offered by this design.

The manner in which these types of spreaders and other devices that would attach to the back of a truck needs to be improved for safety and ease of attachment concerns.

SUMMARY OF THE INVENTION

The present invention provides an improved hitch mechanism that offers an easy and safe way for attachment and is adaptable for attaching any number of different kinds of devices to a truck for device use.

The hitch mechanism includes a hitch receiver that attaches to the truck.

The hitch mechanism also includes a pair of pull arms that are independent of each other. One end of each pull arm attaches to the hitch receiver and the other end of the pull arm attaches to a device being used with the truck.

The pull arms each have extension capabilities, including both a coarse and a fine extension.

The pulls arm can be raised vertically from a pivot point near the attachment to the coupler bar. The vertical raising can be done using any mechanism, but a preferred mechanism is a hydraulic one. When using a hydraulic power, the hitch mechanism can be hooked up to the hydraulics of the truck so that a separate hydraulic system is not necessary.

The attachment to the truck should be of the kind that would let each pull arm pivot vertically and have some degree of horizontal movement so that the pull arms can swing when attaching to a device. One example of an attachment between the pull arm and the coupler bar is a horizontal ball hitch extending from the hitch receiver and a sleeve lock coupler attached to the proximal end of the pull arm. With the ball hitch attachment to the pull arm, the pull arm can be raised vertically as well as have some horizontal swinging motion.

The attachment to the device can also use a similar ball hitch and coupler sleeve lock arrangement, with the ball hitch attached to the device and the coupler sleeve lock attached to the distal or free end of the pull arm.

The invention also includes a method of using the hitch assembly with a vehicle and a device that needs to be attached to the vehicle to function properly. The device can be any kind of a device that would need a vehicle support to accomplish its intended purpose. One example of such a device is a material spreader. The hitch assembly facilitates attaching the material spreader to the vehicle and the material can then be appropriately spread using the vehicle.

Other devices may be traffic signs that need to be attached to a vehicle, with the hitch assembly providing a convenient way to position the traffic sign behind the vehicle to alert traffic, e.g., an arrow sign indicating a lane closure. Another device could be a crash barrier or a material conveyor. In fact, any device that could be attached to a vehicle, rear or front, and be operated for the device's intended purpose could be used with the inventive hitch assembly.

DETAILED DESCRIPTION OF THE INVENTION

Figure 1:
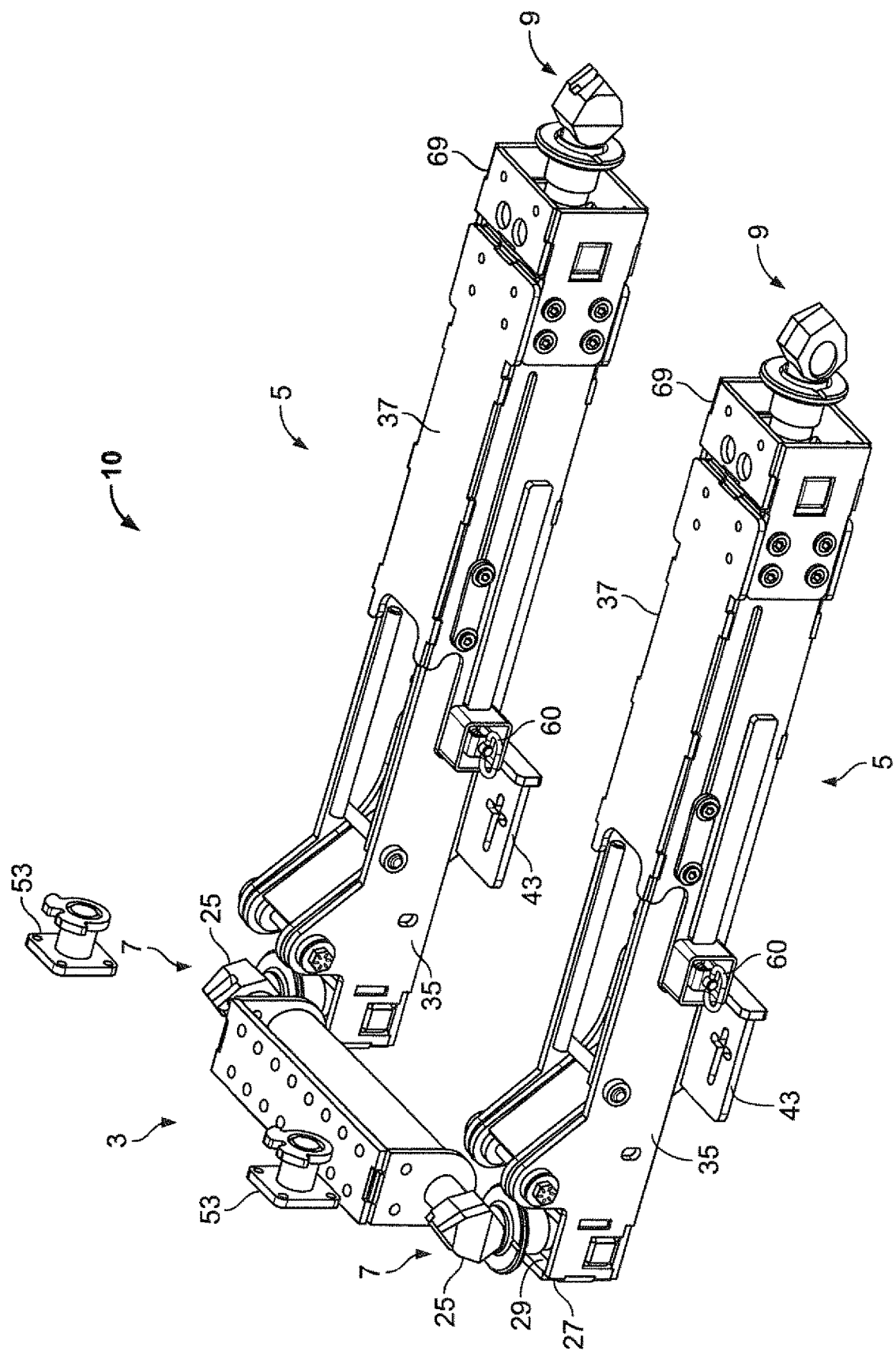
FIG. 1 is a perspective view of one embodiment of the hitch assembly of the invention.

FIG. 1 shows one embodiment of the inventive hitch mechanism assembly, which is designated by the reference numeral 10. The components of the hitch mechanism assembly include a hitch ball receiver assembly 3, which is designed to attach to a vehicle like a truck so that one end of two pull arm assemblies 5 can be attached to a truck. The other end of each pull arm can then be attached to another device like a material spreader. The attachment modes can vary with the device attached first and then the pull arms attached to the hitch receiver or vice versa.

Each pull arm assembly 5 has a coupling mechanism 7 on one end for attachment to the hitch ball receiver assembly 3 and another coupling mechanism 9 on the other end of the pull arm assembly 5 to attach to a device to be hitched to the truck.

Figure 2:
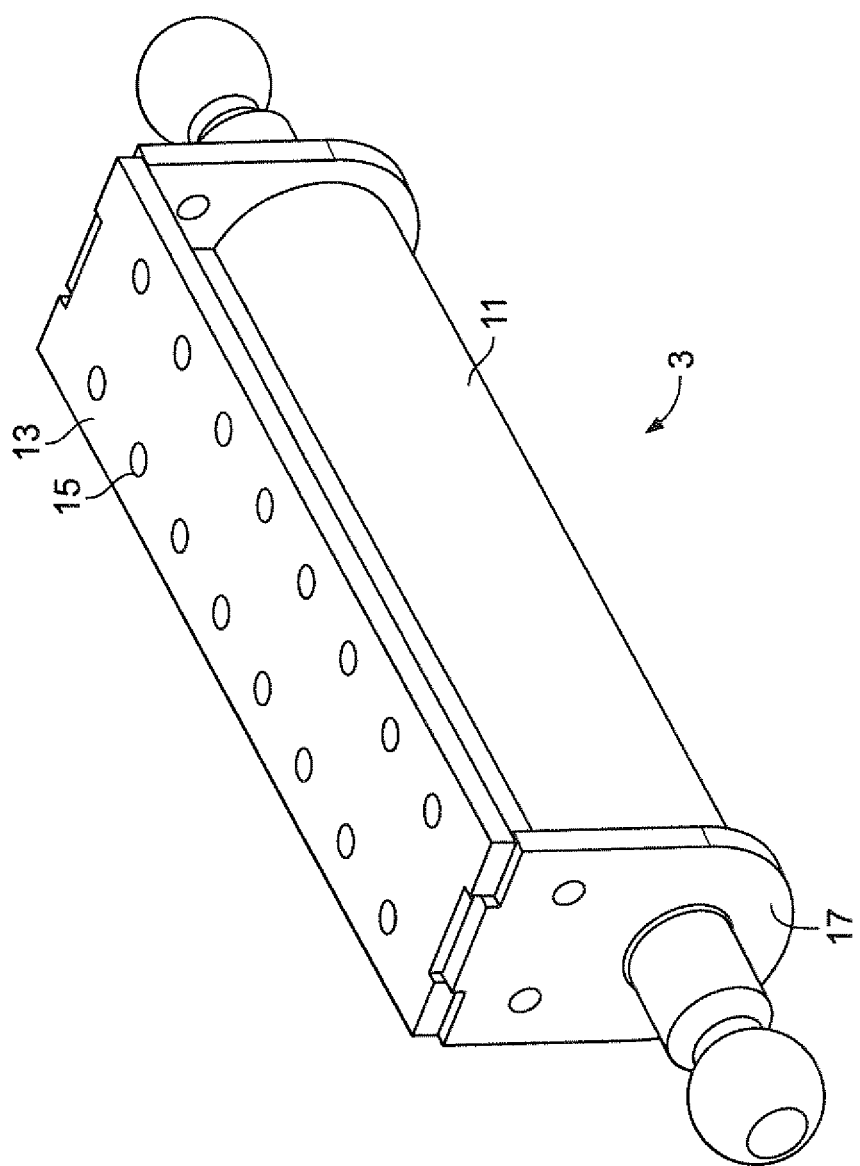
FIG. 2 is a perspective view of the hitch ball receiver of the hitch assembly of FIG. 1.
Figure 3:
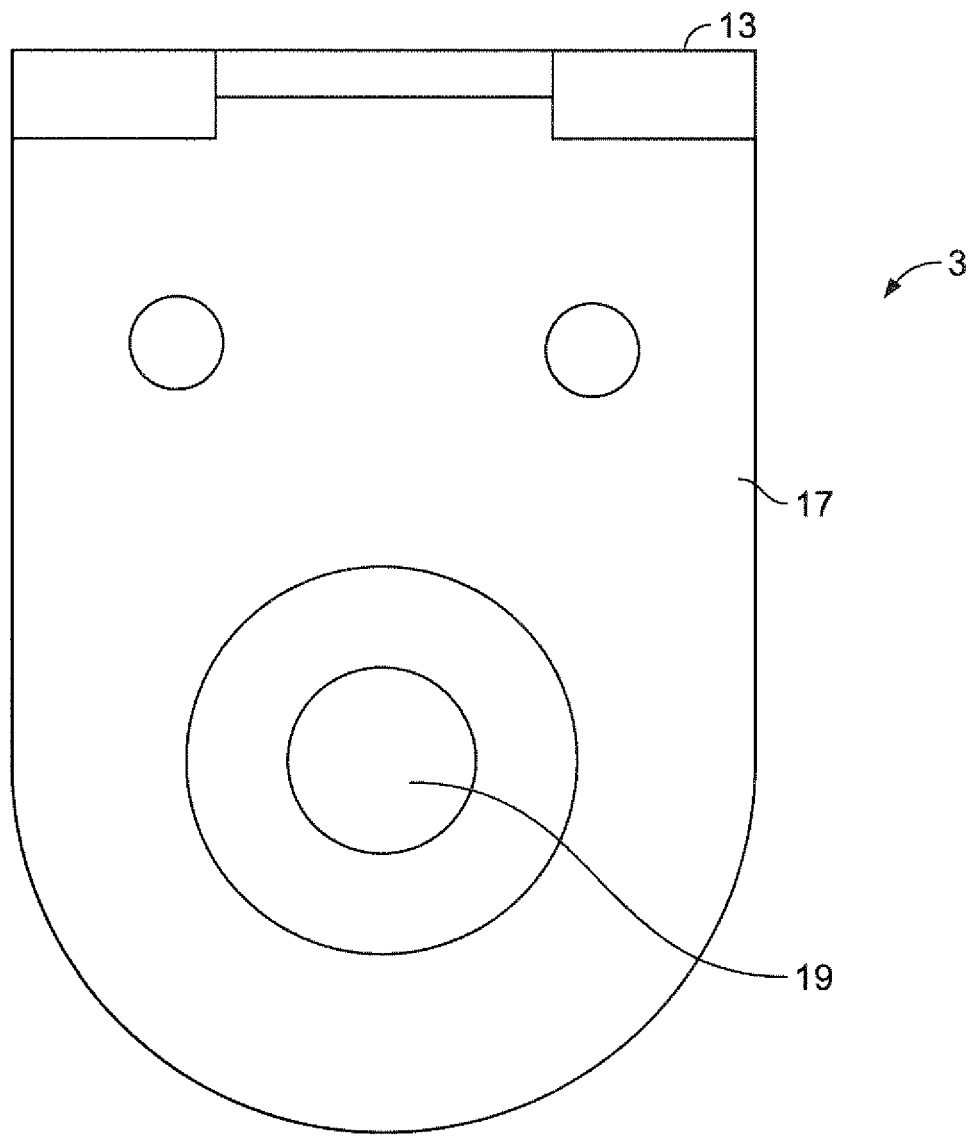
FIG. 3 is a side view of the hitch ball receiver of FIG. 2.

The hitch ball receiver 3 is shown in an isometric view of FIG. 2 and the side view of FIG. 3. The hitch ball receiver 3 includes a body 11, which is designed to be mounted to a vehicle like a truck. In the FIG. 2 embodiment, the body 11 includes a plate 13 with a number of openings 15 to allow attachment to the vehicle using fasteners. It should be understood that other mounting configurations can be used to attach the body 11 to the vehicle.

Figure 4:
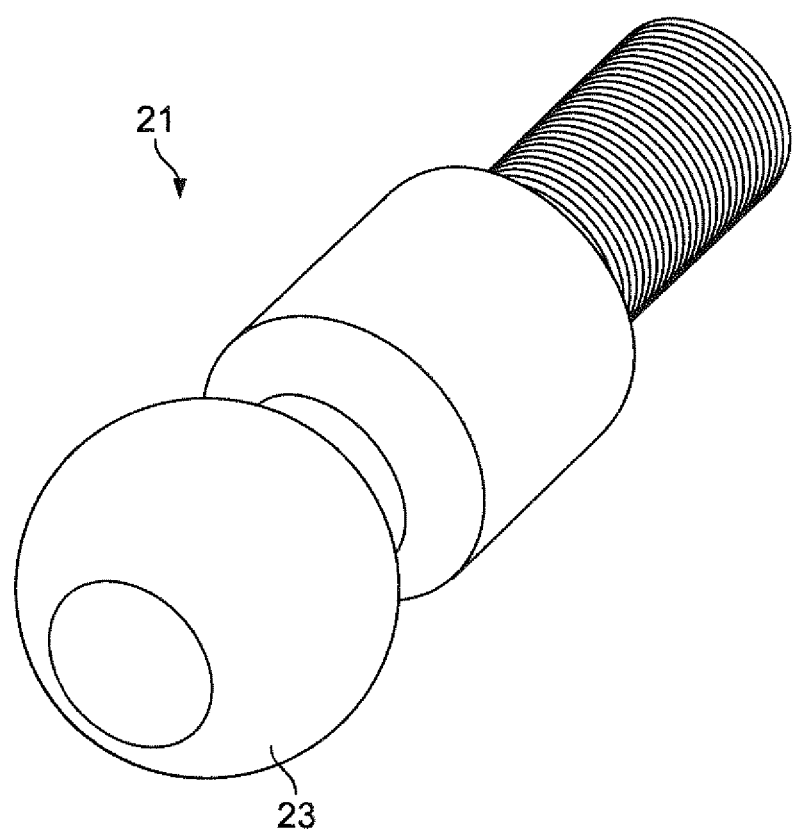
FIG. 4 is a perspective view of the ball hitch of the hitch ball receiver of FIG. 2.
Figure 5:
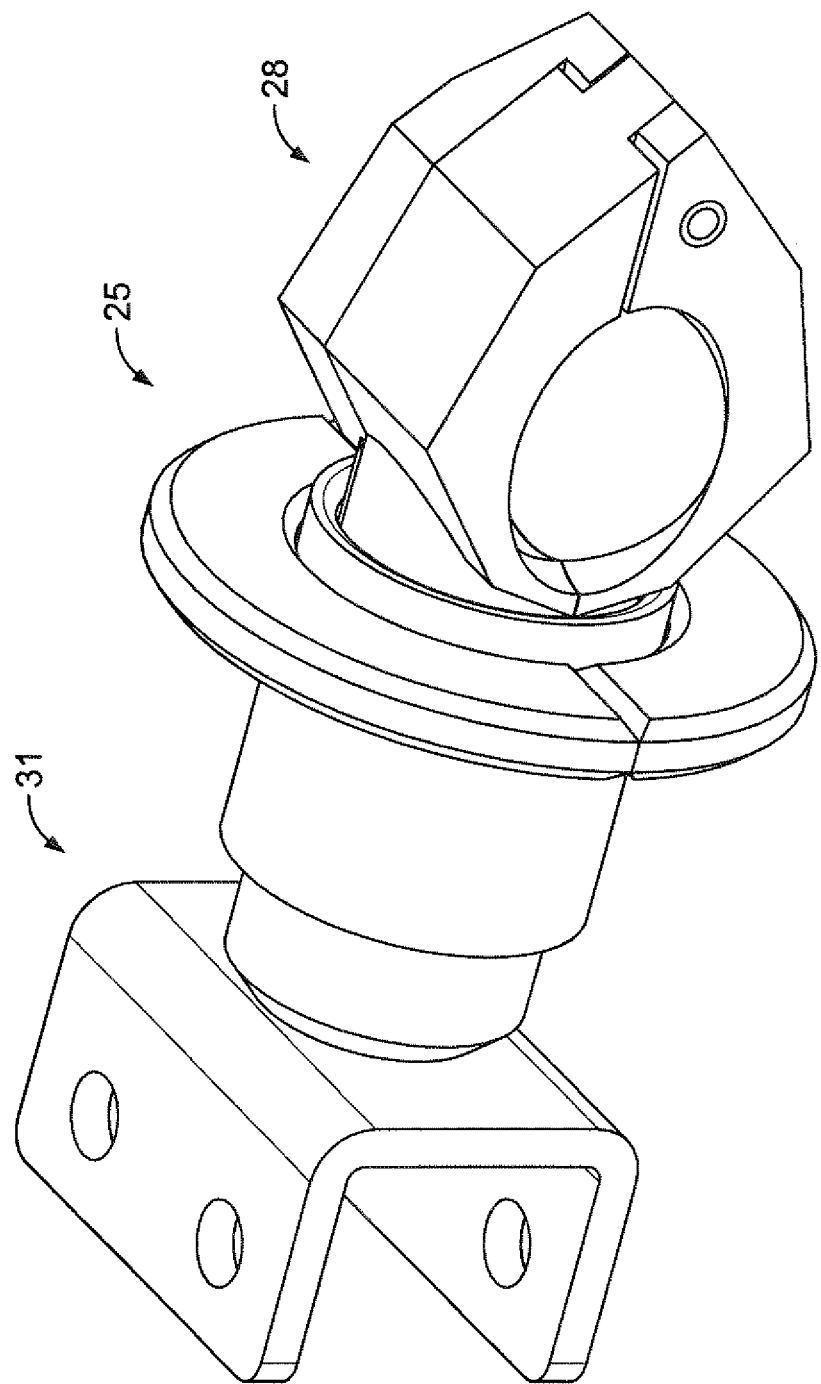
FIG. 5 is a perspective view of the sleeve lock coupler of the hitch assembly of FIG. 1 and that interfaces with the ball hitch of the hitch ball receiver of FIG. 2.

The end 17 of the hitch ball receiver 3 is configured with an opening 19 to receive a ball hitch shank 21. An exemplary ball hitch is shown in FIG. 4. The ball 23 of the ball hitch shank interfaces with a sleeve lock coupler 25 as shown in FIG. 5. The sleeve lock coupler 25 is a standard piece of coupling equipment, particularly for trailers and uses a coupler head 28 that captures the ball 23 of the ball hitch 21. Since this coupling operation is well understood in the field of couplers, a further explanation is not required for understanding of this aspect of the invention. Each sleeve lock coupler 25 is attached to one end 27 of each pull arm assembly 5. The end 27 includes an opening 29 that allows a flange end 31 of the sleeve lock coupler to be bolted to the end 27.

The ball hitch and sleeve lock coupler attachment between the hitch ball receiver 3 and pull arms 5 allows the pull arms to be raised vertically using a hydraulic lift mechanism 33, which is illustrated in FIGS. 6-10. The pull arm assembly 5 includes an inner box 35 and an outer box 37, see FIG. 1. These two boxes allow for length adjustment of the pull arm assembly as detailed below.

Referring back to FIGS. 6-10, the hydraulic lift mechanism 33 includes a pivot arm 39 that is pivotally attached at 41 to the inner box 35. The pivot arm 39 includes a pair of wings 43, with each wing having an opening 45 therein, see in particular FIG. 10. A hydraulic cylinder 47 is mounted between one mounting point 49 on the pivot arm 39 and a second mounting point 51, which is secured to the inner box 35.

Figure 6:
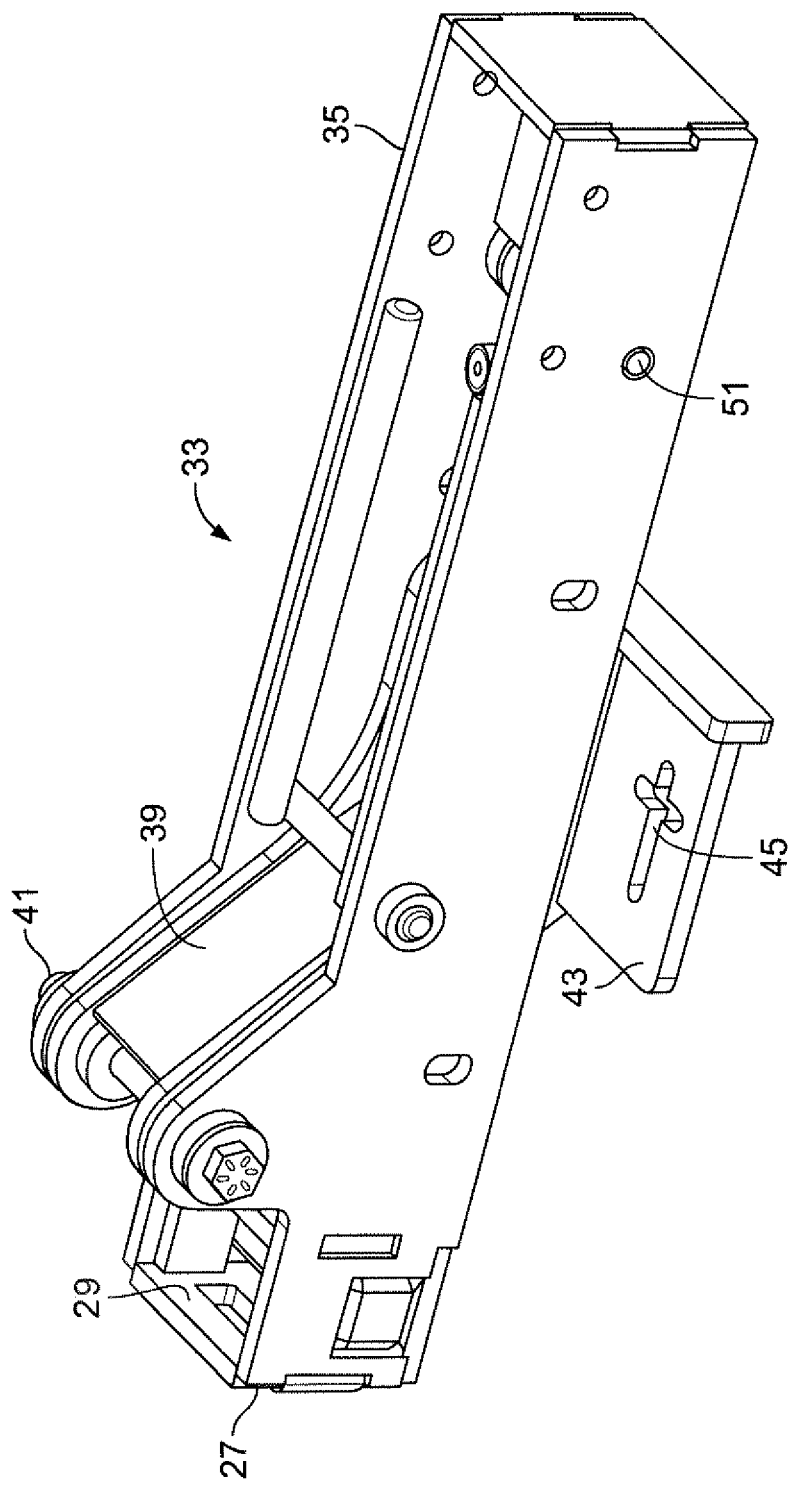
FIG. 6 is a perspective view of the inner box of one of the pull arm assemblies of a hydraulic lift mechanism of the hitch assembly of FIG. 1.
Figure 7:
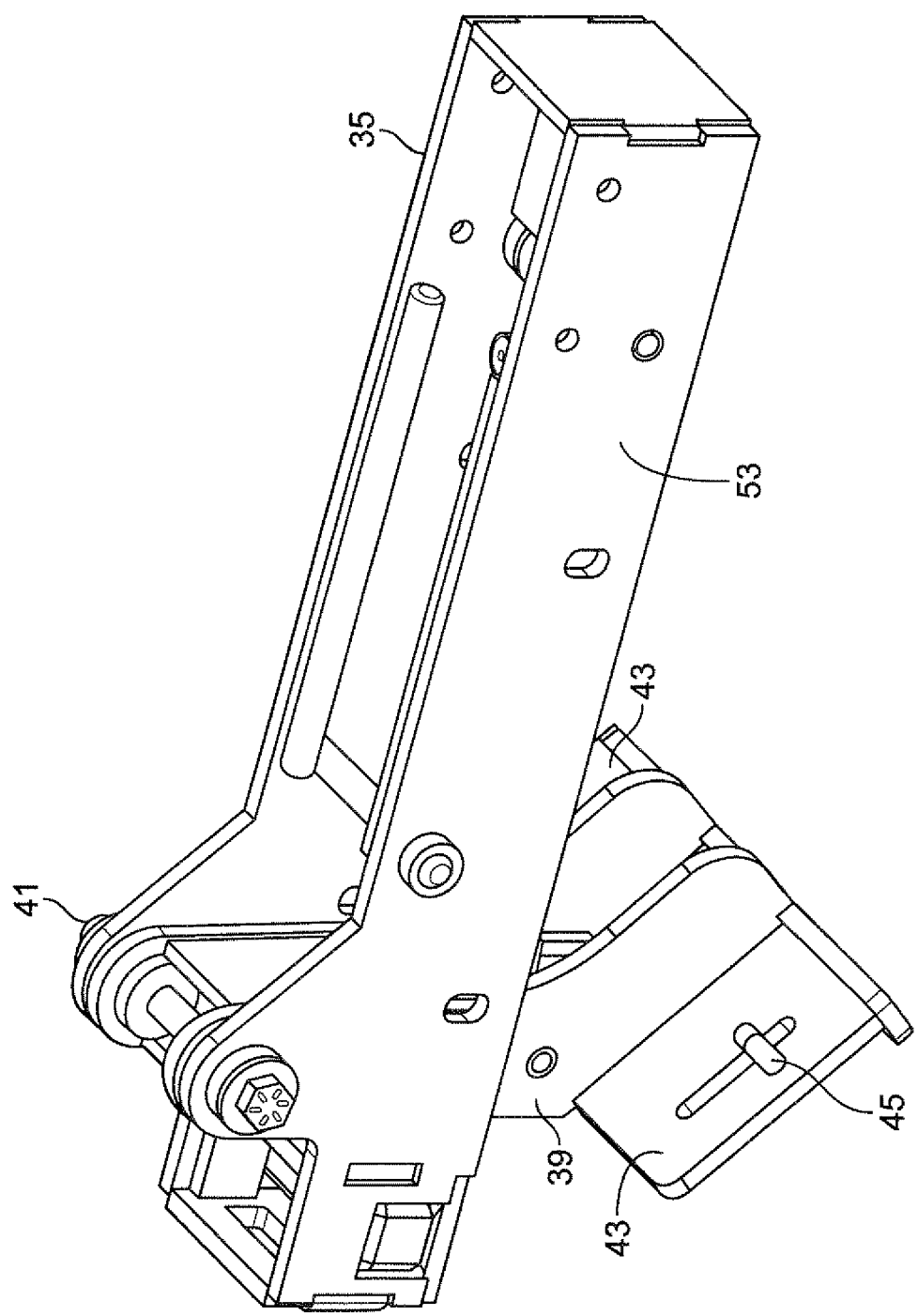
FIG. 7 shows the hydraulic lift mechanism of FIG. 6 with the pivot arm moved by piston extension.
Figure 8:
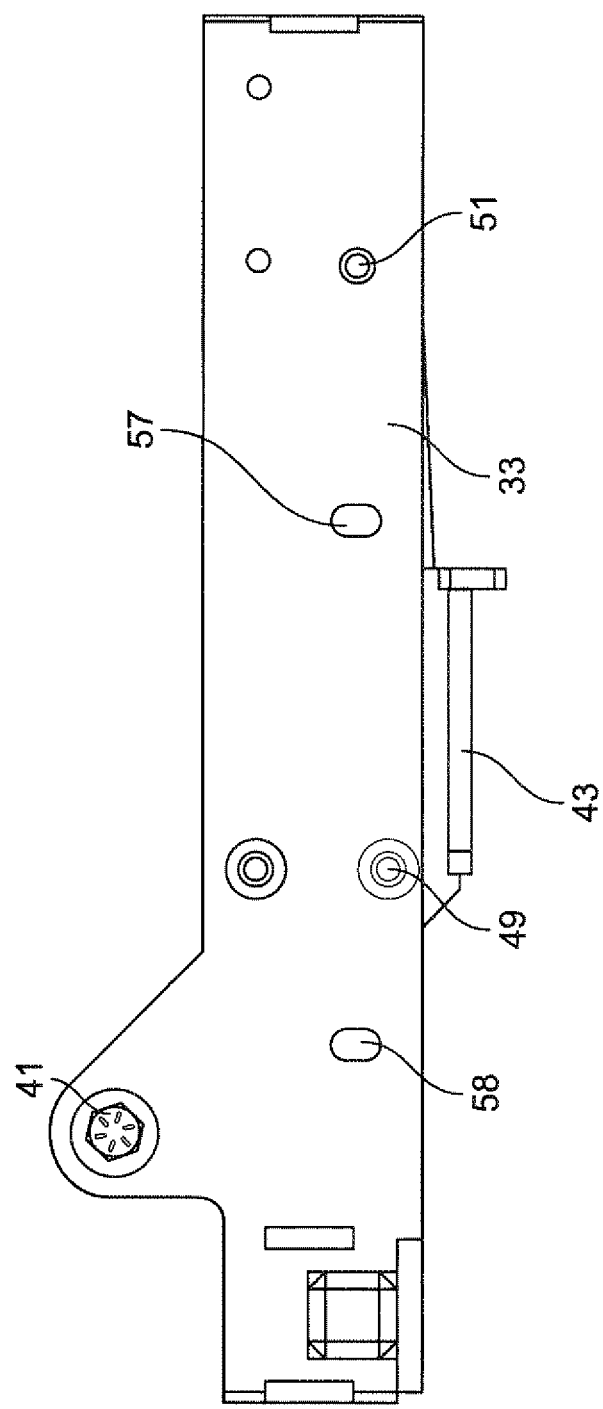
FIG. 8 shows a side view of the hydraulic lift mechanism of FIG. 6.
Figure 9:
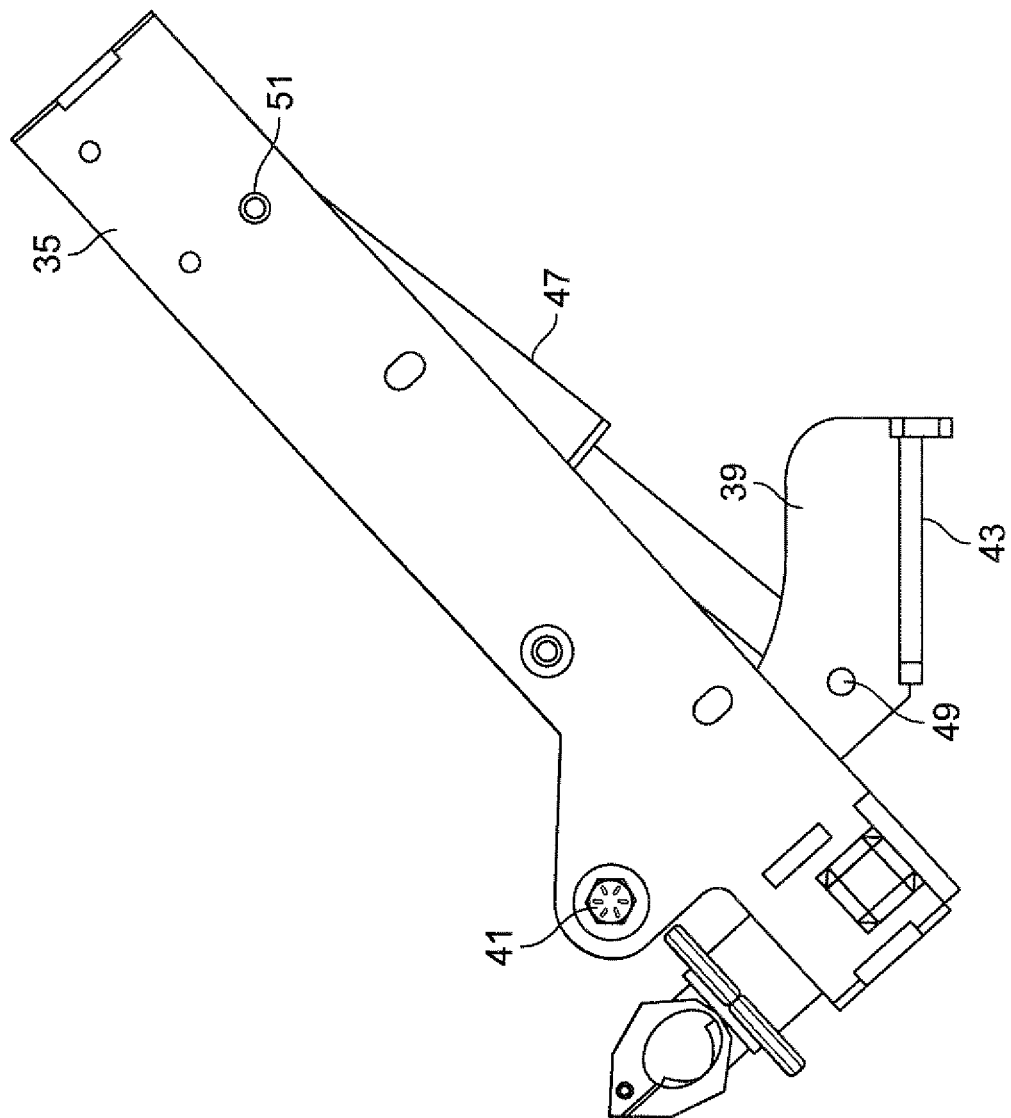
FIG. 9 shows a side view of the hydraulic lift mechanism of FIG. 7.
Figure 10:
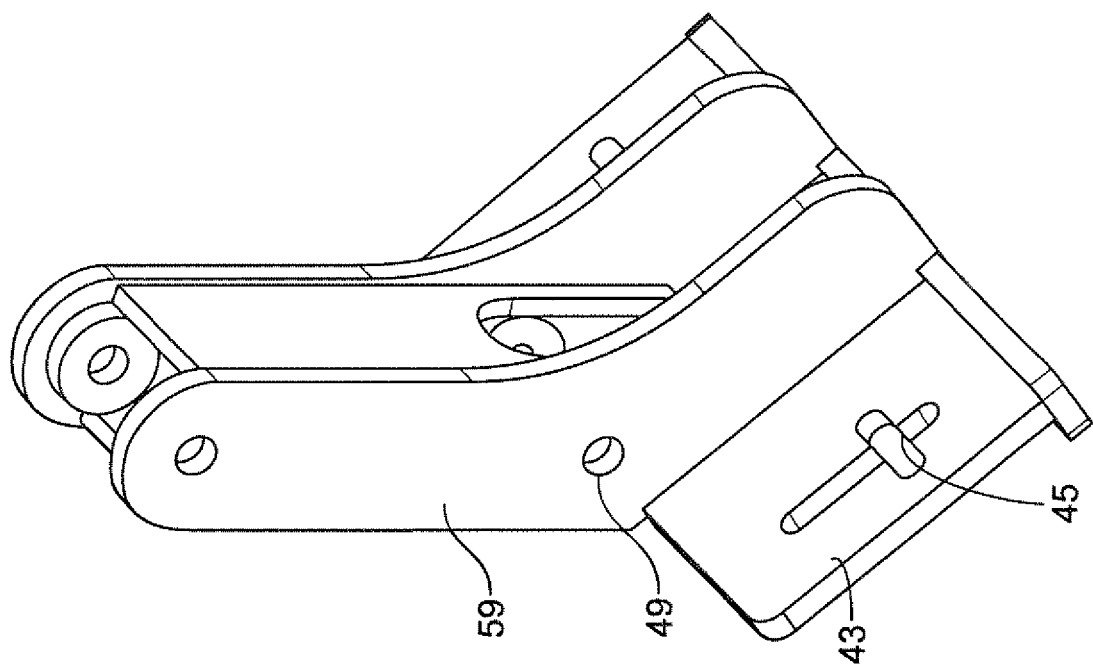
FIG. 10 shows a perspective view of the piston arm and wing of the hydraulic lift mechanism of FIG. 6.
Figure 11:
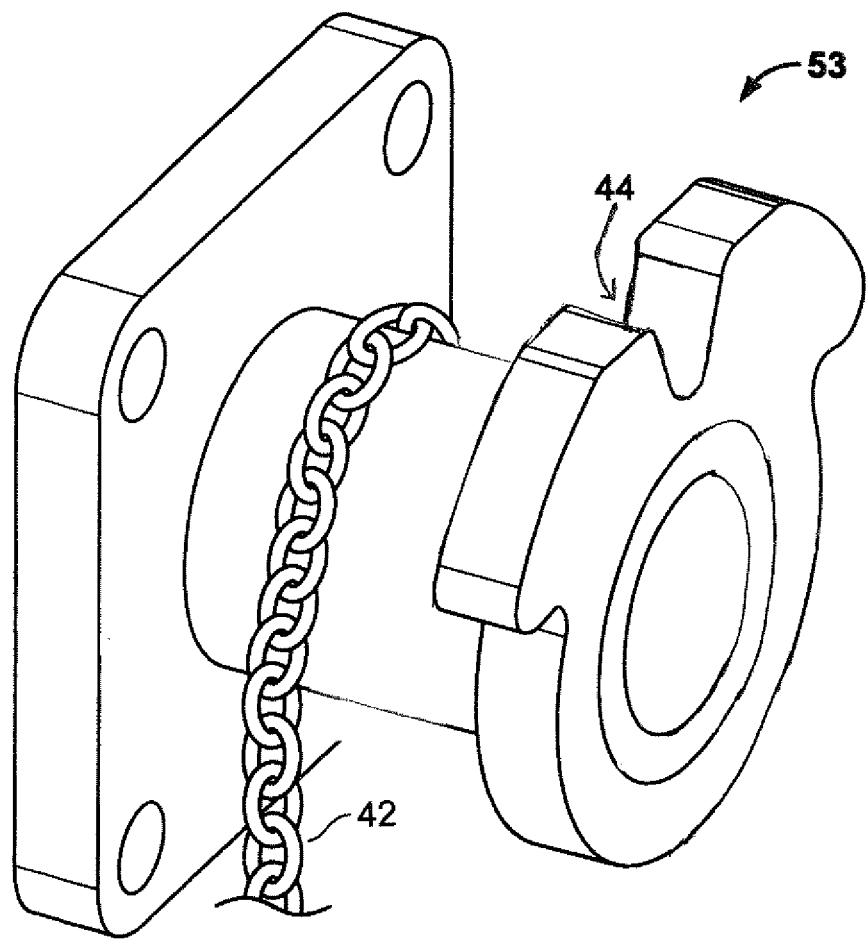
FIG. 11 shows an enlarged perspective view of the chain hook shown in FIG. 1 with a chain.

Another part of the hydraulic lift mechanism 33 is a pair of chain hooks 53, see FIGS. 1 and 11. Each chain hook 53 is mounted to the back of the vehicle and at an elevation greater than the point of attachment between the ball 23 and the sleeve lock coupler 25. A chain 42 would extend from the opening 45 in one wing of the pivot arm 39, across the chain hook 53 and to the other opening 45 in the other wing 43 of the plate 39. The chain hook could be configured with a slot 44 to allow a tool to be used to help left the chain up for removal and avoid the need for a user to try and remove the chain without a tool and risk injury. The chain length would be configured so that the wings 43 are held in a generally horizontal position and in line with the inner box 35 as shown in FIG. 6. In this configuration, the hydraulic cylinder 47 is in its retracted position. Once the hydraulic cylinder has its piston extended, see FIGS. 7 and 9, the wings 43 being prevented from downward movement by the chain attachment to the chain hooks 53, the action of the hydraulic cylinder 47 raises the inner box 35 (and entire pull bar assembly 5) as shown in FIG. 9. This action allows the hitch mechanism 10 to lift whatever device may be attached to the free ends of the pull arms 5. The cross-shaped opening 45 allows the chain to be slipped through the opening and then rotated to easily adjust the chain length when attaching to the two wings 43. The hydraulic cylinder 47 can easily be removed at the pivot mounting points 49 and 51 during use of the device attached to the pull arm assemblies to minimize interference or drag.

The hydraulic lift mechanism 33 can include the necessary couplings to tie into the hydraulic system of the vehicle carrying the hitch mechanism. In this way, the hitch mechanism does not need a separate supply of hydraulic power to lift the pull arm assemblies. Although a hydraulic system is preferred, systems that are mechanical and/or electrical can be employed for lifting purposes. In one example, the hydraulic cylinder can be replaced with a mechanical ratchet bar of a type similar to those employed on a ratcheting jack stand. This would allow lifting by a separate device such as an electric hoist, and the ratchet would retain the spreader in the lifted position. The hydraulic lift mechanism allows for gravity to keep the device attached to the hitch mechanism at a desired and non-raised elevation and uses the hydraulic lift mechanism just for raising the pull arms. Once the hydraulic pressure is released, the pull arm assemblies would lower as a result of gravity. Since there is a hydraulic lift mechanism for each pull arm, the pull arm assemblies can be raised at different heights to allow for tilt control of the device attached to the vehicle.

Figure 12:
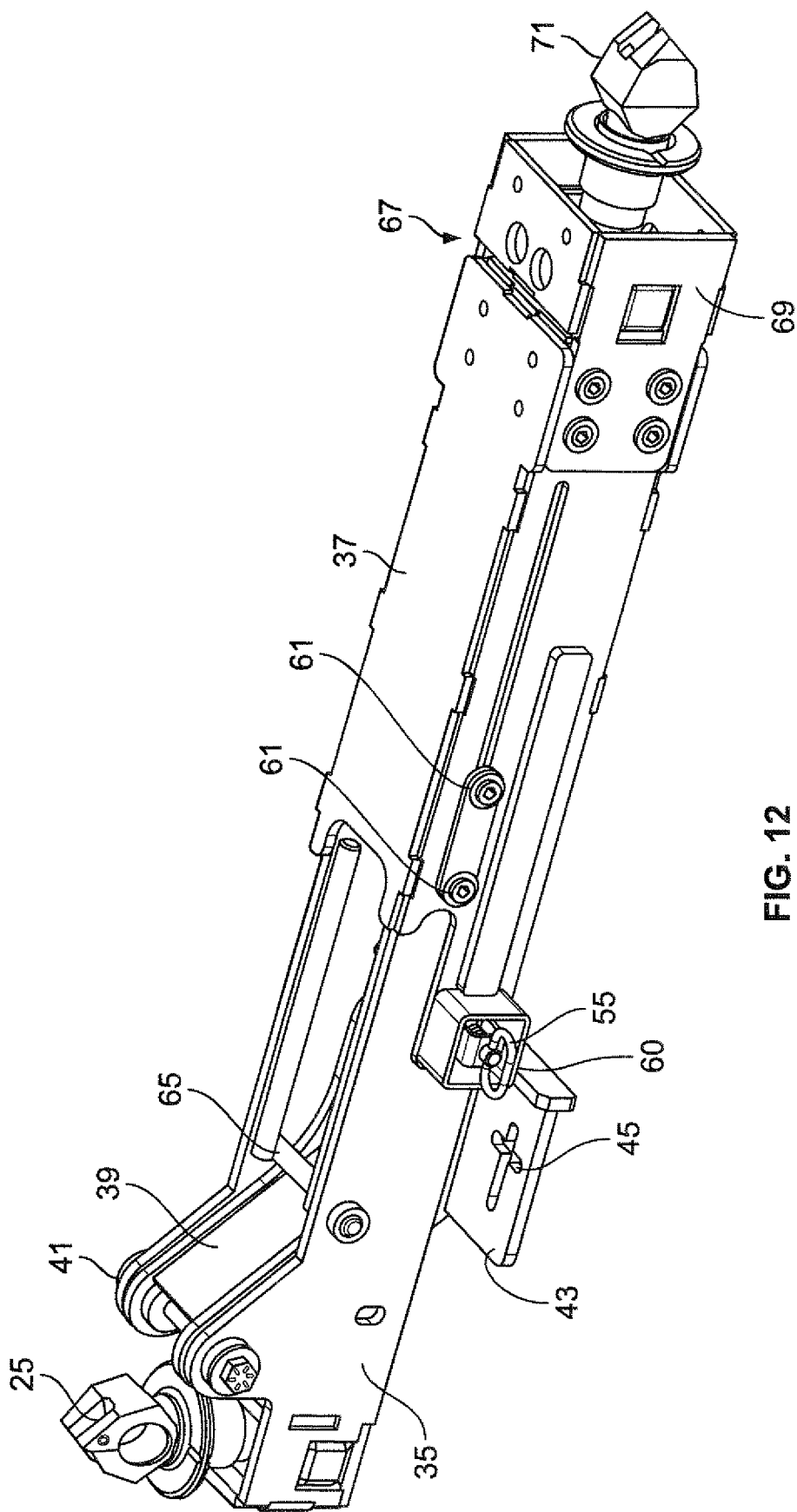
FIG. 12 shows a perspective view of one of the pull arm assemblies of the hitch assembly of FIG. 1, including both the inner and outer boxes.
Figure 13:
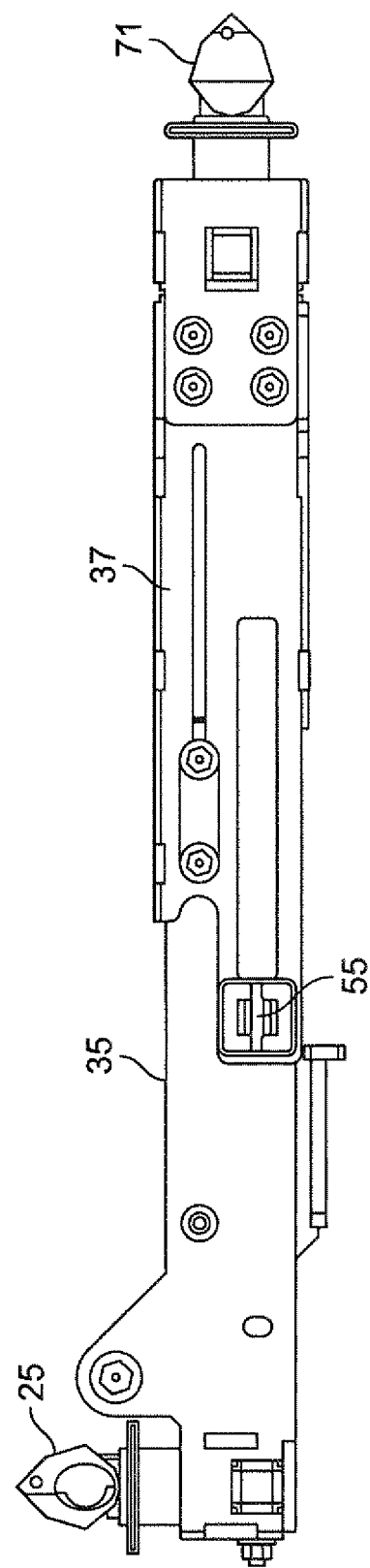
FIG. 13 shows a side view of the pull arm assembly of FIG. 12.
Figure 14:
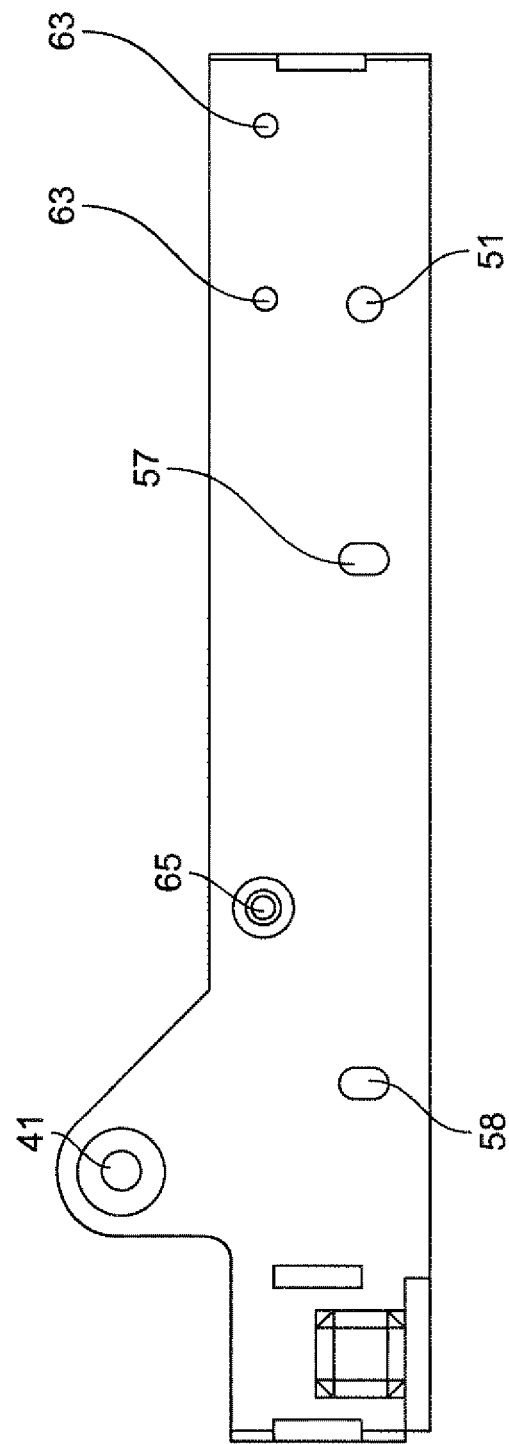
FIG. 14 shows a side view of the inner box of the pull arm assembly of FIG. 12.
Figure 15:
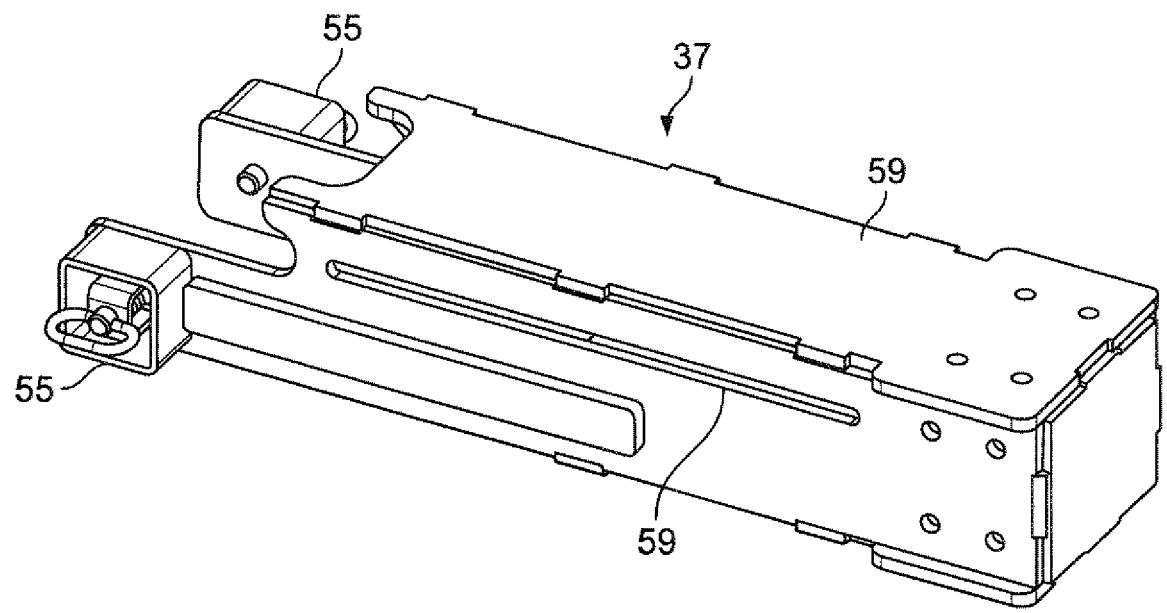
FIG. 15 shows a perspective view of the outer box of the pull arm assembly of FIG. 12.
Figure 16:
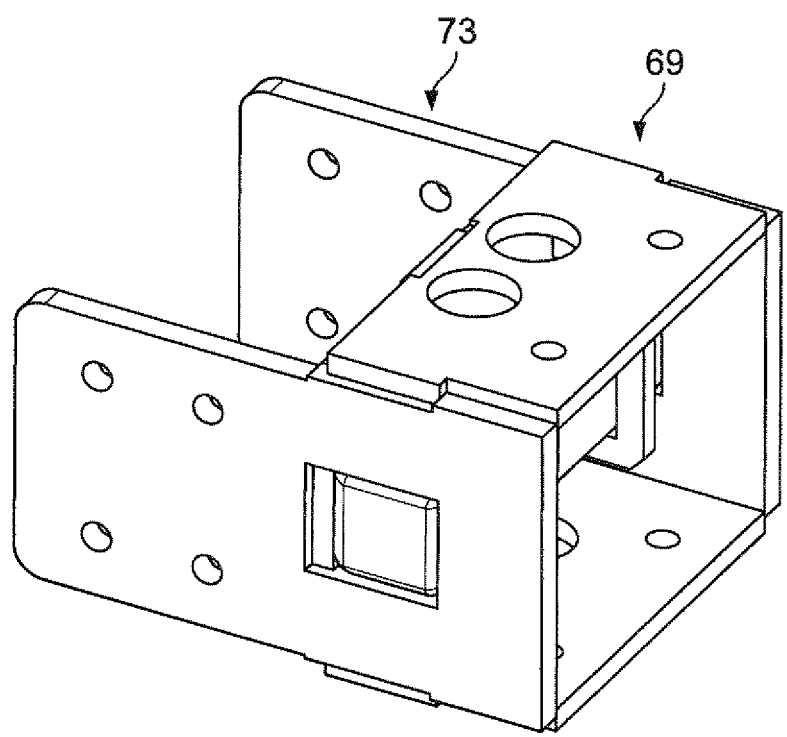
FIG. 16 shows the bracket at the end of the pull arm assembly of FIG. 12.

As noted above, the pull arm assemblies 5 have a length adjustment feature to allow the hitch mechanism to more easily link to a device. Referring now to FIGS. 12-15, the inner box 35 and outer box 37 are configured to have two different length adjustment mechanisms. A first mechanism employs a pair of spring loaded pins 55, which are part of the outer box 37. As shown in FIG. 12, the inner box 35 is sized to slide within the outer box 37. The inner box has spaced apart oblong holes 57, 58, see FIG. 14. These holes are design to receive the pin 55 to restrict the relative movement of the inner and outer boxes 35 and 37. The pins 55 are the type where the pin is extended when the pin handle 60 is turned one way and then retracted when turned the other way. This allows for a no tool way to change the length of the pull arm assemblies 5. While two holes 57, 58 are shown separated by a relatively large distance, e.g., 12 inches, any number of holes and hole to hole spacings could be used to allow more flexibility in pull arm length adjustment.

The outer box 37 has a pair of slots 59. These slots are designed to interface with a pair of bolts 61. The bolts 61 are connected to the inner box 35 at openings 63, see FIG. 14. In operation, when the pin 55 is not engaged in one of the holes 57, the outer box can slide along the length of the inner box, the sliding guided by the bolts 61 moving along the slots 59. This allows a fine length adjustment of the pull arm, which can be beneficial when the pull arms are being attached to a device. The bolts 61 would not be so tight to the inner box 35 so as not to allow the sliding movement of the outer box 37 with respect to the inner box 35. However, the bolts 61 could be tightened to the inner box 35 so that the inner and outer boxes 35 and 37 are held in place by the bolts 61. This mode could be used alone and without the pins 55 or when the pins 55 are used to link the boxes 35 and 37 together.

The inner box also has a member 65 spanning the width of the inner box near the pivot point of the pivot arm 39. This member 65 provides some structural rigidity to the inner box as it is open at the top and bottom for the hydraulic lifting action. The member 65 can also be pinned on the outside of the inner box to provide a stop for the travel of the outer box 37. This can help relieve any tension on the pins 55 when the pull arm assembly is in its shortest length position.

In operation, the shortest length of the pull arm assemblies, i.e., the pin 55 engaging the hole 58, would normally be used when using a material spreader so that the dump truck unloading aligns with the spreader material hopper. However, the pull arm assemblies could be lengthened as well if the particular dump truck requires that the spreader be spaced further from the truck rear end. One could also typically extend and pin the pull bars in a longer position so the material spreader is farther from the truck for clearance during the lifting and transport process.

Still referring to FIGS. 12-15, the free ends 67 of the pull arm assemblies 5 include a bracket 69, which facilitates attachment of another set of sleeve lock couplers 71 to the free end 67. The bracket 69 can be bolted to the end of the outer box at 73 and provide a mount for the sleeve lock couplers 71. When using the sleeve lock couplers 71 at the free ends 67 of the pull arm assemblies, a pair of ball hitch shanks, just like that shown in FIG. 4 can be horizontally mounted on the device to be attached to the truck in the same manner as ball hitch 21 and sleeve lock couplers are attached together.

With the ball hitch 21 and sleeve lock coupler 25 attachment at the receiver 3, the pull arms can be lifted vertically using the ball hitch as the pivot point. Also, the pull arm assemblies can also swing to a limited degree horizontally by the ball hitch and sleeve lock coupler attachment. The extent of swing is limited by the fact that the shank of the ball hitch would ultimately contact the coupler head of the sleeve lock coupler.

Figure 17:
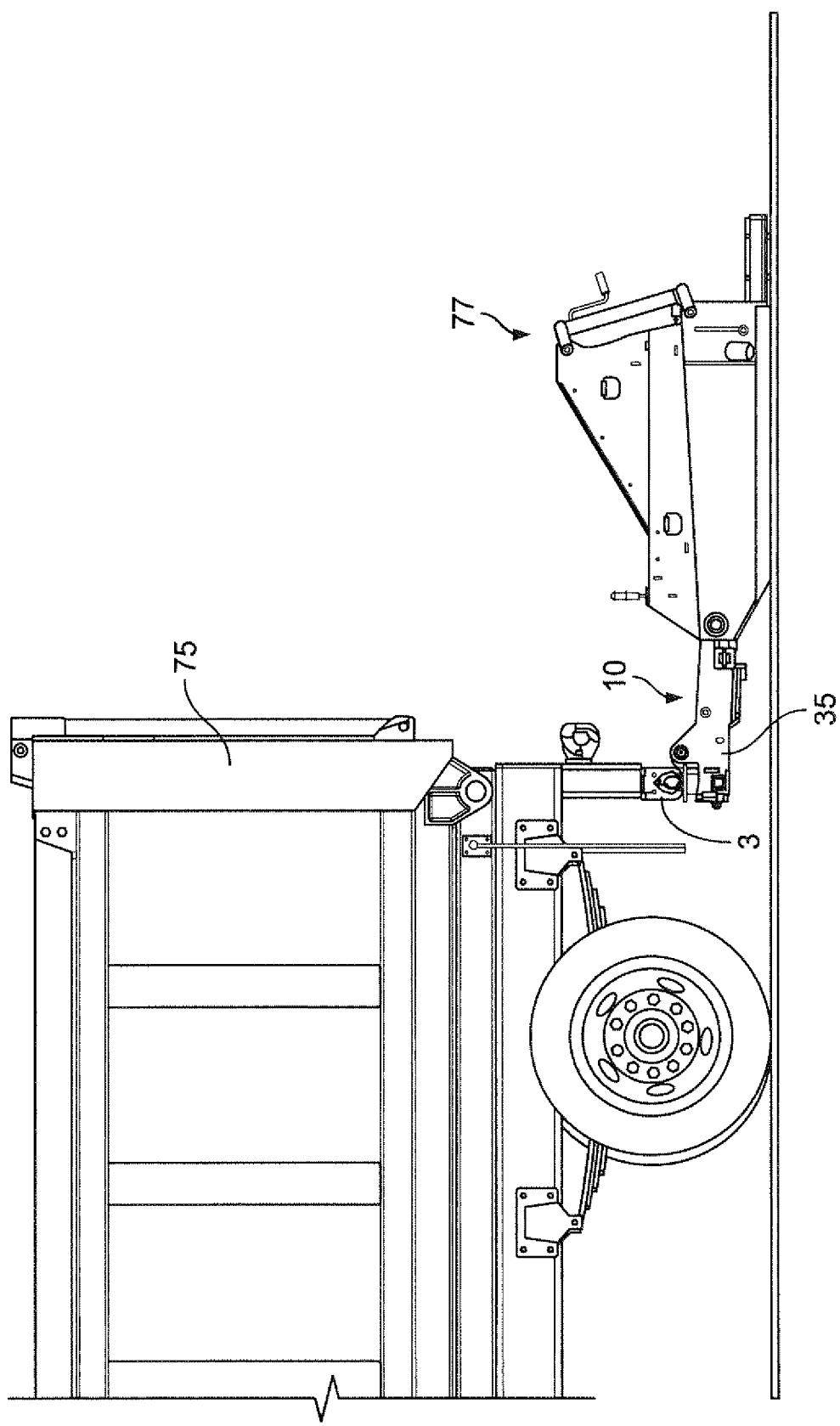
FIG. 17 shows the hitch assembly of FIG. 1 attached to a truck and supporting a material spreader.
Figure 18:
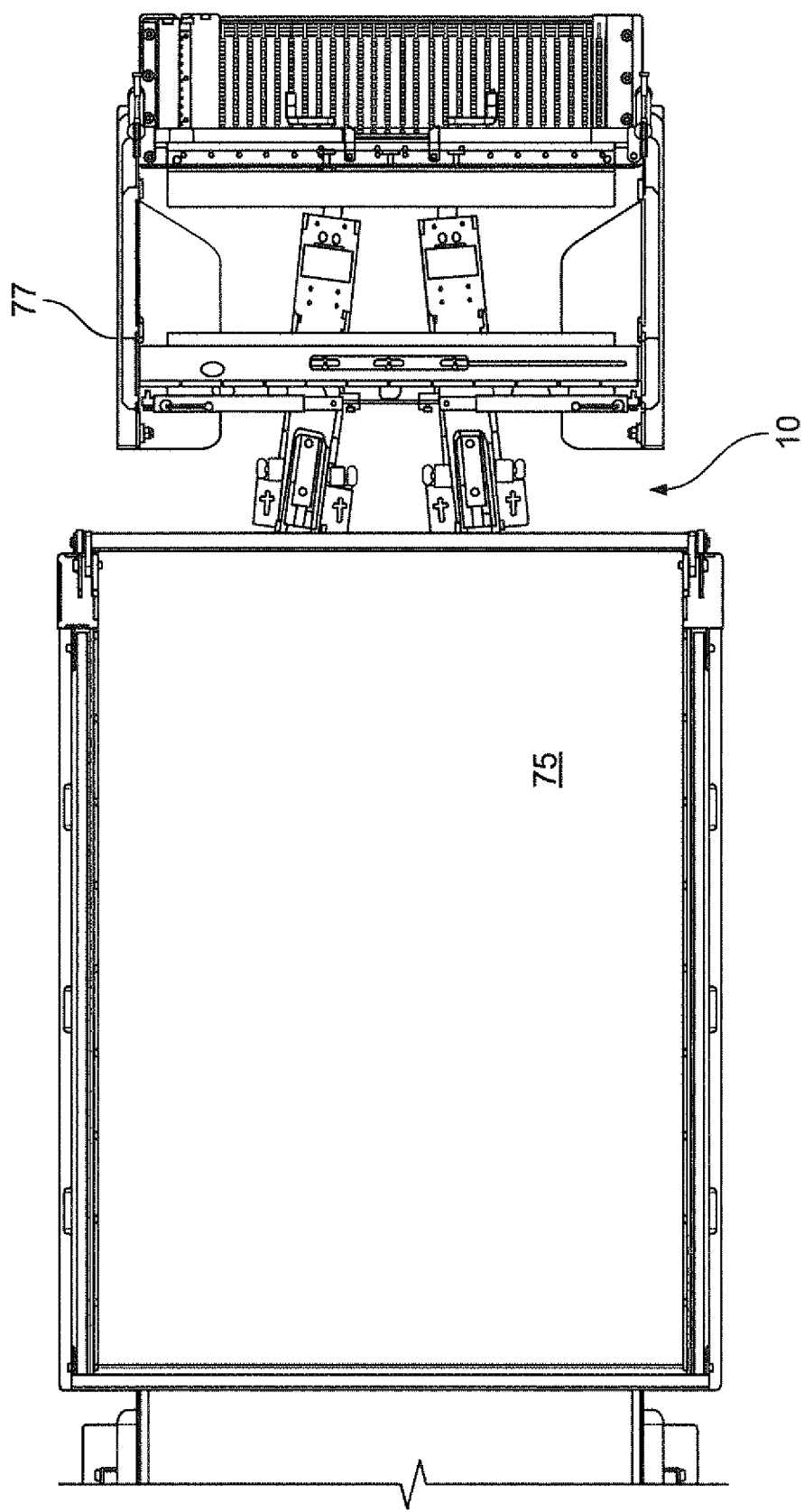
FIG. 18 shows a plan view of FIG. 17 and horizontal movement capability of the hitch assembly.
Figure 19:
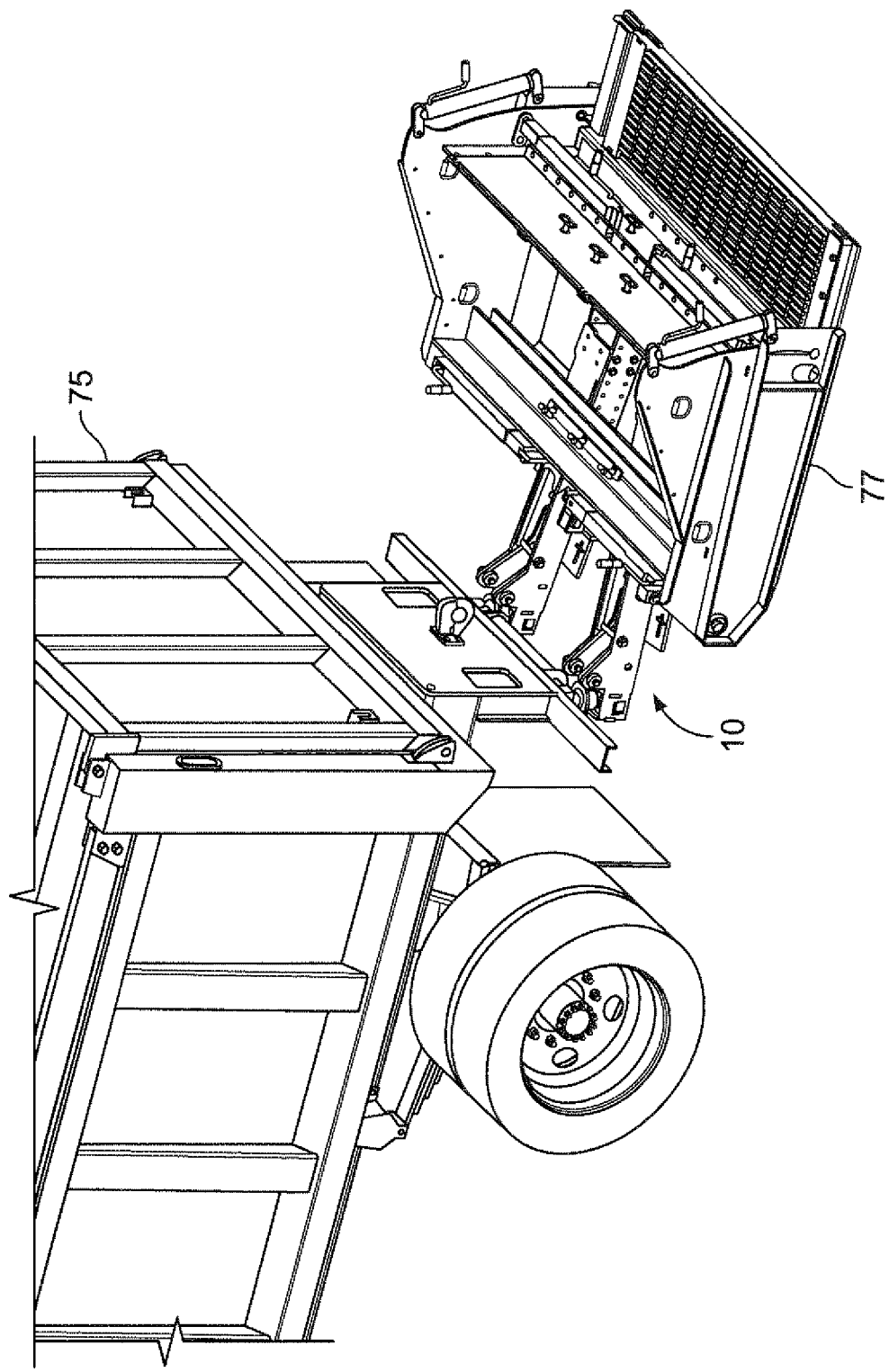
FIG. 19 shows a top perspective view of FIG. 17.

FIGS. 17-19 shows exemplary uses of the inventive hitch assembly with a truck 75 and material spreader 77. FIG. 18 shows how the pull arm assemblies can move horizontally.

While a ball hitch and sleeve lock coupler arrangement is shown to attach the hitch mechanism to the receiver 3 and the ends of the pull arm assemblies to a device, other coupling arrangements that would allow the pull arms to pivot in the vertical direction and swing horizontally can be used. These would include the use of pintle hook rings, and tractor style lower link ball sockets but any kind of attachment that allows the movement of the pull arm assemblies could be employed between the pull arm assemblies, the vehicle, and the device being linked to the vehicle. Similarly, the length adjustment features of the inner and outer boxes are exemplary and other types of length adjustment mechanisms could be employed that allow the pull arm assemblies to have different lengths to facilitate attachment or detachment to a particular device.

The hitch mechanism provides a low profile attachment to a vehicle that can avoid damage to the hitch mechanism when attached. In some dump trucks, the bed overhangs the back frame of the truck. Therefore, when the bed is raised for dumping, the bottom edge of the bed can come close to the ground and possibly damage any hitch that is used to link a device like a material spreader to the truck. The inventive hitch mechanism, with its sideways attachment between the hitch receiver 3 and sleeve lock couplers 25, helps maintain a low profile for the pull arm assemblies and minimizes the possibility of a dump truck bed contacting and damaging the pull arms assemblies.

In use, the hitch receiver would be attached to the vehicle intended to pull an apparatus or device using the hitch mechanism. Then the pull arm assemblies could be attached to the hitch receiver. With the pull arm assemblies attached, if necessary, the length of the pull arm assemblies could be changed and then the apparatus or device would be attached to the free ends of the pull arm assemblies using whatever coupling arrangement is provided. The apparatus or device can be raised so that the truck can be used to transport the apparatus to and from a work location. Once at the desired location, the apparatus can then be easily lowered into the work position. In an alternative use, if the apparatus/device is a material spreader, once the spreader is attached and filled with the material to be spread, the truck can move forward to pull the spreader and distribute the material therein.

While the pull arm assemblies are each movable with respect to the hitch receiver, once the pull arm assemblies are connected between the hitch receiver and the device being linked to the vehicle, the hitch assembly becomes rigid if the pull bars are set at an angle relative to each other. The hitch assembly is flexible if the pull bars are set parallel to each other.

The hitch mechanism of the invention provides a universal kind of hitch that can be attached to any number of vehicles and provide an easy and efficient way to attach a device to the vehicle for a given use.

Other advantages include the following:

1) The hitch mechanism is low profile so that it can be used on vehicles that have a high GVWR capacity such as a dump truck but limited room for attaching a product for towing.

2) Having the dual pull bar assemblies allows the load to be better distributed and offers more control of the load in a manner similar to the lower arms on a 3 Point Tractor Hitch but in a smaller package.

3) The hydraulic up, gravity down lift system to prevent damage to attached products similar to a snow plow hitch for the rear of a vehicle but with tilt control.

4) A hitch mechanism provides a quick attach system that utilizes two removable and swappable attachment points. This provides swing and pivot adjustment and up to 60,000 pounds of towing capacity depending on components used.

5) The hitch system can attach using different methods such as long shank ball hitches, pintle hook rings, and tractor style lower link ball sockets.

6) Using the long shank hitch ball attachment removes the need for hitch pins. This keeps the operator out of the pinch area during hook-up.

7) The hitch mechanism has a "no tool" mechanical length adjustment i.e., using the pins 55, for each pull bar assembly and allowing up to 12" of adjustment for each side. This helps when using large tow vehicles such as dump trucks that are difficult to align properly and attach to products.

8) Each pull bar arm is independently controlled allowing each arm to be raised and lowered as needed. This allows hydraulically powered tilt and leveling control.

9) The hydraulic lift system can be quickly unhooked from the pull bars to prevent drag or interference with the product being attached.

10) The hitch mechanism can be designed for use with an existing hydraulic system by tapping into the hydraulics that control another function such as the bed dump control on a dump truck.

11) The hitch mechanism allows a dump truck to use attachments normally intended for a tractor.

12) The hitch mechanism provides a new way to attach specialty equipment to a dump truck such as highway crash barriers, asphalt paving equipment, salt spreaders, and mobile conveyors.

The various embodiments described above are provided by way of illustration only and should not be construed to limit the claims attached hereto.

Those skilled in the art will readily recognize various modifications and changes that may be made without following the example embodiments and applications illustrated and described herein, and without departing from the true spirit and scope of the following claims.

I claim:

1. A hitch mechanism adapted to be attached to a vehicle and support a device comprising:
   a hitch receiver adapted to attach to the vehicle,
   a pair of pull arms, a first end of each pull arm attached to the hitch receiver and a second end of each pull arm configured to attach to the device, each pull arm having an adjustable length and being both pivotal horizontally and pivotal vertically where the first end of each pull arm is attached to the hitch receiver.

2. The hitch mechanism of claim 1, wherein each pull arm further comprises an inner box and an outer box, the inner box and outer box being movable with respect to each other for length adjustment of each of the pull arms.

3. The hitch mechanism of claim 2, wherein the length adjustment includes a first length adjustment and a second length adjustment.

4. The hitch mechanism of claim 1, wherein each pull arm includes a pivot arm and piston assembly, the pivot arm and piston assembly providing vertical pivoting movement of the pair of pull arms.

5. The hitch mechanism of claim 4, wherein a piston of the pivot arm and piston assembly is hydraulically powered and has a hydraulic connection for connecting to a hydraulic system of the vehicle.

6. The hitch mechanism of claim 1, wherein the hitch receiver has opposite ends and a first ball hitch is horizontally mounted to each end, and each end of each pull arm includes a sleeve lock coupler configured to attach to a ball of the first ball hitch, attachment between the ball and the sleeve lock coupler allowing the pull arm to move horizontally and vertically.

7. The hitch mechanism of claim 1, wherein each second end of the respective pull arm has a sleeve lock coupler configured to connect to a second ball hitch on the device.

8. The hitch mechanism of claim 7, further comprising a pair of third ball hitches, each third ball hitch configured to attach to the device for attaching the hitch assembly to the device.

9. A method of attaching a device to a vehicle so that the device can be operated, the method comprising:
   a) mounting the hitch receiver of the hitch mechanism of claim 1 to a vehicle;
   b) mounting the device to the second end of each pull arm assembly so that the device can be operated.

10. The method of claim 9, wherein the device is a material spreader, a material conveyor, a crash barrier, or traffic sign.

* * * * *